Oct. 27, 1942.     E. L. ROSE     2,300,009
POWER TRANSMISSION
Filed Sept. 15, 1937     2 Sheets-Sheet 1

INVENTOR
EDWIN L. ROSE
BY
Ralph L. Tweedale
ATTORNEY

Oct. 27, 1942.  E. L. ROSE  2,300,009
POWER TRANSMISSION
Filed Sept. 15, 1937   2 Sheets-Sheet 2

INVENTOR
EDWIN L. ROSE
BY
*Ralph L. Truesdale*
ATTORNEY

Patented Oct. 27, 1942

2,300,009

UNITED STATES PATENT OFFICE 2,300,009

POWER TRANSMISSION

Edwin L. Rose, Watertown, Conn., assignor to The Waterbury Tool Company, Waterbury, Conn., a corporation of Connecticut Application September 15, 1937, Serial No. 163,883

5 Claims. (Cl. 309—6)

This invention relates to power transmissions and more particularly to those of the type comprising one or more fluid pressure energy translating devices one of which may function as a pump and another as a fluid motor. In transmissions employing pumps or motors of the positive displacement, reciprocating piston type the design of the pump or motor frequently is so arranged that substantial side thrusts are exerted between the pistons and the side walls of the cylinders due to eccentric loading inherent in the particular motion converting means by which the pistons are reciprocated from a rotating shaft. The existence of these side thrusts cause excessive wear on the pistons and cylinders and impose serious limitations on the design of the pump or motor.

It is an object of the present invention to provide a fluid pressure energy translating device of the reciprocating piston type wherein means are provided for positively floating the pistons on an oil film under hydrostatic pressure in such a manner that wear due to side thrusts on the pistons is substantially eliminated. Stated in another way it is an object to provide a piston construction wherein fluid pressure is introduced into the running clearance between the piston and cylinder in such a manner that the piston is maintained substantially centralized in the cylinder bore; that is, with equal clearance all around regardless of the side thrusts exerted on the pistons.

It is a further object to provide, in a device of the character described, means for varying the fluid pressure forces exerted in the clearance space around the piston, automatically in accordance with variations in clearance in a manner to increase the pressure at points where the clearance becomes small and decrease the pressure at points where the clearance becomes large so that the only position in which the piston is in equilibrium is one in which the clearance is substantially equal all around the piston.

Further objects and advantages of the present invention will be apparent from the following description, reference being had to the accompanying drawings wherein a preferred form of the present invention is clearly shown.

Figure 1:
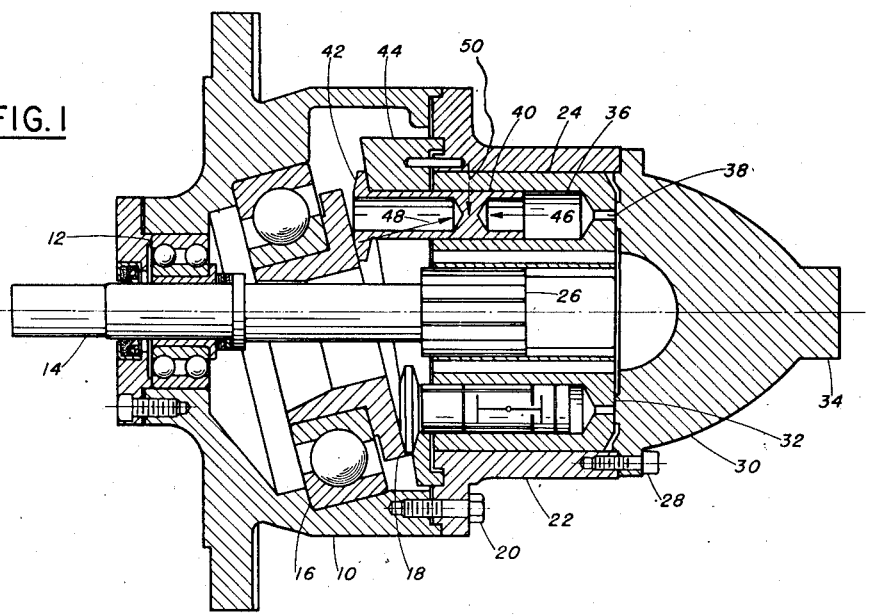
Fig. 1 is a longitudinal cross section of a fluid pressure energy translating device incorporating one form of the present invention.

Referring now to Fig. 1 the fluid pressure energy translating device there illustrated may be utilized either as a pump or as a motor of fixed displacement depending upon whether energy is supplied thereto in the form of mechanical rotation of the shaft or in the form of moving fluid under pressure. The device has been selected for illustration as typical of only one of the many types of pumps or motors with which the present invention may be utilized to advantage. A main frame member 10 is provided which carries bearings 12 on which a main shaft 14 is journalled. Also carried in the frame member 10 is a combined radial thrust bearing 16 on which a reaction plate 18 is rotatably mounted. Secured to the frame member 10 by bolts 20 is a second frame or casing member 22 in which a cylinder barrel 24 is journalled. The barrel 24 is splined to the shaft 14 at 26. Secured to the member 22 by bolts 28 is a valve plate 30 having an annular pressure surface 32 within which are formed two approximately semi-annular valve ports, not shown, which communicate with supply and return conduits formed in the connection boss 34.

The barrel 24 is provided with a plurality of cylinders 36 each of which has a small port 38 which cooperates with the ports in the valve plate 30. Reciprocably mounted in each of the cylinders 36 is a piston 40 having a flanged head 42 which abuts against the reaction plate 18. A piston return cam 44 is mounted on the casing member 22 and has a generated surface such that it engages the under side of each piston head 42 throughout the rotation of the shaft 14.

The mechanism thus far described is well known in the art and its operation need be described but briefly. Considering the device as a pump, it will be seen that when the shaft 14 is rotated so that the top of the cylinder barrel 24 moves away from the observer that all pistons moving down on the far side of the barrel will be forced into the cylinders forcing fluid through the cylinder ports 38 of each of such cylinders into the valve port on the far side of the device, this port then being the delivery port. As the pistons move up on the near side of the device the return cam 44 will withdraw the pistons from the cylinders 36 drawing fluid into the ports 38 from the valve port on the near side of the device, this port then being the suction port. As each cylinder port 38 passes through top dead center and bottom dead center, they pass from one valve port to the other, this action taking place while the in or out movement of the piston is substantially zero.

Figure 2:
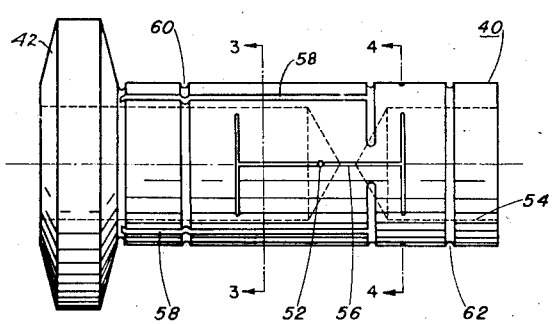
Fig. 2 is a side view of a piston incorporated in the mechanism of Fig. 1.
Figure 3:
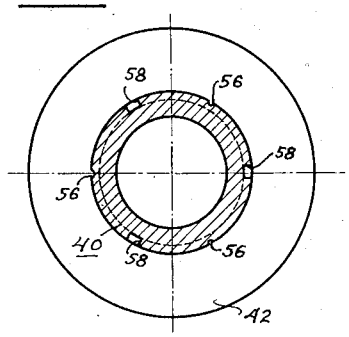
Fig. 3 is a cross section on line 3—3 of Fig. 2.
Figure 4:
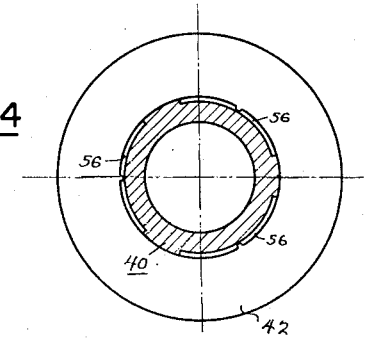
Fig. 4 is a cross section on line 4—4 of Fig. 2.
Figure 5:
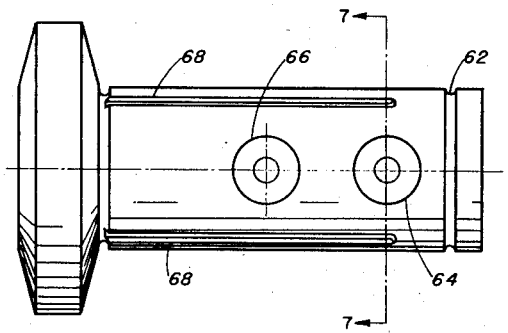
Fig. 5 is a side view of a piston incorporating a second form of the invention.
Figure 6:
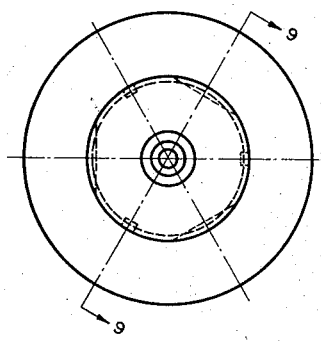
Fig. 6 is an end view of the piston shown in Fig. 5.
Figure 7:
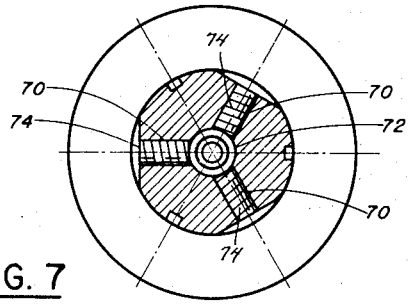
Fig. 7 is a cross section on line 7—7 of Fig. 5.
Figure 8:
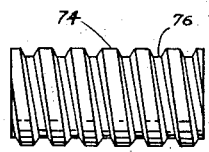
Fig. 8 is a side view of a capillary restricter plug used in the piston of Fig. 5.
Figure 9:
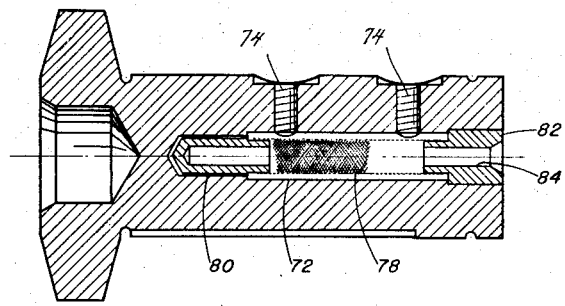
Fig. 9 is a longitudinal cross section on line 9—9 of Fig. 6.

It will be seen that the force exerted by the fluid in the cylinders 36 on the pressure side of the device, which resists inward movement of the pistons 40, acts along the piston axis as indicated by the arrow 46 while the thrust exerted by the reaction plate 18 on the piston 40 is represented by the arrow 48 which is at an angle to the arrow 46, since this force is necessarily perpendicular to the plane of the thrust plate 18. In order to balance these two forces acting on the piston, there must be a third force such as that represented by the arrow 50 which is transmitted to the piston from the cylinder wall and thus represents the side thrust previously referred to. In pumps and motors as heretofore constructed this thrust tends to break down the oil film between the piston and cylinder causing metal to metal contact and resulting in excessive wear. These difficulties are avoided by the present invention in the following manner:

Referring to Figs. 2, 3 and 4 the piston 40 is provided with three small bores 52 which communicate between the piston outer wall and a large bore 54 formed in the right end thereof for purposes of lightness. The bores 52 thus transmit fluid from the cylinder 36 to the clearance space between the piston and cylinder walls. Leading from the outlet of the bores 52 there are formed on the side walls of the piston at three equally spaced positions around the same a set of capillary grooves 56 which are substantially H-shaped as illustrated. These grooves are of very small depth and width amounting to little more than scratches on the finished piston surface but yet providing a passage for fluid which is somewhat larger than the passage through the normal clearance space between the piston and cylinder where the former is not grooved. Between each set of capillary grooves 56 there is provided a set of relief grooves 58 which are of substantial depth and width so that the laws of viscous flow are not important to the fluid flow in these grooves. The grooves 58 are substantially T-shaped with an additional annular groove 60 connecting all the grooves at a point to the left of the capillary grooves 56. The grooves 58 lead to the flange end of the piston and thus are in constant communication with the interior of the casing member 10. One or more dirt catching grooves 62 may also be provided adjacent the right-hand end of the piston.

In operation a certain amount of fluid flows through the bores 52 and leaks into the case by passing through the capillary grooves 56 and across the clearance space to the relief grooves 58 and 60. There is also a certain proportion of fluid which passes directly across the clearance from the end of the hole 52 to the clearance grooves 58. This latter quantity of fluid is immaterial to the action of the device. Considering now the fluid flow across the clearance space from the right-hand vertical portion (in Fig. 2) of the groove 56 to the adjacent vertical portion of the relief groove 58, it will be seen that in order to flow across this path the fluid has to pass through the horizontal portion of the capillary groove 56. If the piston happens to be so positioned that a side thrust tends to close up the clearance at that one of the capillary grooves 56 which is now being considered, the flow across the clearance space is very materially reduced below normal and consequently the quantity of fluid which must be supplied through the horizontal portion of the groove 56 is considerably diminished. With this resulting small flow through the horizontal part of the groove the pressure drop therethrough is small so that at all points along the vertical part of the groove 56, the pressure of the oil in the groove is higher than it would be if the clearance at this point were normal. The fluid in the clearance space is thus at a higher average pressure over the area between the vertical parts of the grooves 56 and 58 so that there is a distinct increase in force tending to separate the piston and cylinder walls. At the same time the clearance on the opposite side of the piston, that is, 180° away from the point being considered, is greater than normal and (assuming for simplicity that there were but two capillary grooves 56 instead of 3) an exactly opposite action takes place in the area between the capillary groove 56 and the relief groove 58 on the opposite side of the piston. That is, due to the increased clearance a greater quantity of fluid must be supplied through the horizontal part of the groove 56 and due to this increased flow the pressure drop through the groove is greater so that the average pressure over the clearance area is less and the force tending to separate the piston and cylinder at this point is diminished. It is thus apparent that the action on both sides of the piston tends to restore the piston to a centralized position where the clearance is equal on both sides and that whenever the piston is displaced from this equilibrium position restoring forces are immediately set up in proportion to the displacement and in the opposite direction. For the sake of complete stability in all directions a minimum of three sets of capillary and relief grooves must be provided.

It will also be seen that should the piston be displaced from its centralized position by a couple tending to move the left-hand end of the piston (in Fig. 2) away from the observer and the right-hand end toward the observer, the pressure in the clearance space adjacent the right-hand end of the groove 56 is increased, while that adjacent the left-hand end is decreased, thus setting up a restoring force in the opposite direction to the applied couple. Thus, the piston is completely stabilized to resist displacing forces of any nature.

Referring now to Figs. 5 through 9 a second form of the invention is illustrated wherein the capillary passages are provided within the walls of the piston rather than on their outer surfaces. For this purpose the piston is provided with three pairs of relieved spots 64 and 66 circumferentially and axially spaced around the piston. Intermediate these areas there is provided three longitudinal relief grooves 68. At each relieved area 64 and 66 the piston is provided with a radial bore 70 leading to a central longitudinal bore 72 (see Fig. 9). Within each bore 70 there is mounted a plug 74, the cylindrical exterior of which is provided with a helical groove 76. The plugs 74 are preferably mounted in the bores 70 by a shrink-fit to insure against leakage across the lands between the grooves 76. Within the bore 72 there is mounted a filter or strainer comprising a screen 78 mounted on plug members 80 and 82 the latter of which is provided with a through bore 84 so that fluid from the cylinder may enter the interior of the screen 78 and prevent dirt particles from entering the small helical passages 76.

The operation of this form of the invention will be clear from the previous description. The only difference is that the fluid is supplied to the clearance space through the capillary grooves 76, the cross sectional area of which is independent of the clearance at any point. The stabilizing action of this form of the invention may thus be made more pronounced than that of the form previously described. It should be understood, however, that in the piston illustrated in Figs. 2 through 4 the fact that, with an increase in clearance the effective depth of the capillary groove 56 increases does not prevent the stabilizing action from taking place. This is due to the fact that under the laws of viscous fluid flow the resistance of a given conduit varies inversely with the third power of its cross sectional dimension. Thus, if it be assumed that the depth of the groove 56 from the cylinder wall to the bottom of the groove were double the average clearance between the finished surface of the piston and the cylinder barrel, then if the clearance were temporarily doubled due to displacement of the piston, the depth of the groove would be increased by 50%. Accordingly, since the resistance varies inversely with the third power of the cross sectional dimension, the resistance through the clearance space would be only one-eighth of the normal resistance while the resistance through the groove would still be approximately one-third the normal resistance therethrough.

While the form of the embodiment of the invention as herein disclosed, constitutes a preferred form, it is to be understood that other forms might be adopted, all coming within the scope of the claims which follow.

What is claimed is as follows:

1. The combination of a cylinder containing a fluid under pressure and a piston subject to a side thrust, and means for stabilizing the piston laterally in the cylinder comprising means forming conduits each having a restricted portion lying entirely within the piston body for feeding said fluid from the cylinder to the side walls of the piston, said conduits being so proportioned as to cause a pressure drop in the fluid passing therethrough, which increases with an increase in clearance between the piston and cylinder at the discharge end of any conduit, and means including relatively unrestricted grooves on the piston surface and communicating with a point of low pressure outside the cylinder for limiting the pressure area over which fluid supplied by any conduit is effective, whereby fluid pressure forces are produced tending to maintain the piston centralized in the cylinder.

2. The combination of a cylinder containing a fluid under pressure and a piston subject to a side thrust, and means for stabilizing the piston laterally in the cylinder comprising means forming conduits each having a restricted portion lying entirely within the piston body for feeding said fluid from the cylinder to the side walls of the piston at a plurality of positions spaced circumferentially around the piston and spaced axially thereof as well, said conduits being so proportioned as to cause a pressure drop in the fluid passing therethrough which increases with an increase in clearance between the piston and cylinder at the discharge end of any conduit, and relief passages formed in the piston to limit the pressure area over which fluid supplied by any conduit is effective, whereby fluid pressure forces are produced tending to maintain the piston centralized in the cylinder.

3. The combination of a cylinder containing a fluid under pressure and a piston subject to a side thrust, means for stabilizing the piston laterally in the cylinder including restricted conduits comprising capillary passages in the piston body for feeding said fluid from the cylinder to the side walls of the piston, said conduits being so proportioned as to cause a pressure drop in the fluid passing therethrough which increases with an increase in clearance between the piston and cylinder at the discharge end of any conduit, whereby fluid pressure forces are produced tending to maintain the piston centralized in the cylinder, and means in the piston for filtering the fluid entering said passages.

4. The combination of a cylinder containing a fluid under pressure and a piston subject to a side thrust, means for stabilizing the piston laterally in the cylinder including restricted conduits comprising capillary passages in the piston body for feeding said fluid from the cylinder to the side walls of the piston at a plurality of positions spaced circumferentially around the piston and spaced axially thereof as well, said conduits being so proportioned as to cause a pressure drop in the fluid passing therethrough which increases with an increase in clearance between the piston and cylinder at the discharge end of any conduit, whereby fluid pressure forces are produced tending to maintain the piston centralized in the cylinder, and means in the piston for filtering the fluid entering said passages.

5. The combination of a cylinder containing a fluid under pressure and a piston subject to a side thrust, and means for stabilizing the piston laterally in the cylinder including a control chamber for receiving fluid from the cylinder and restricted conduits comprising capillary passages in the piston body for feeding said fluid from said chamber to the side walls of the piston, said conduits being so proportioned as to cause a pressure drop in the fluid passing therethrough which increases with an increase in clearance between the piston and cylinder at the discharge end of any conduit, a filter in said chamber and means for limiting the pressure area over which fluid supplied by any conduit is effective, whereby fluid pressure forces are produced tending to maintain the piston centralized in the cylinder.

EDWIN L. ROSE.